United States Patent [19]

Szlaga

[11] Patent Number: 4,805,663
[45] Date of Patent: Feb. 21, 1989

[54] FLOW CONTROL VALVE

[75] Inventor: Emil Szlaga, Connersville, Ind.

[73] Assignee: Stant Inc., Connersville, Ind.

[21] Appl. No.: 107,663

[22] Filed: Oct. 13, 1987

Related U.S. Application Data

[62] Division of Ser. No. 935,814, Nov. 28, 1986, Pat. No. 4,715,403.

[51] Int. Cl.[4] .................. F16K 24/00; F16K 17/26
[52] U.S. Cl. ..................... 137/493.2; 137/493.9; 137/538; 137/540
[58] Field of Search ............... 137/493.2, 493.1, 493.8, 137/493.9, 538, 540

[56] References Cited

U.S. PATENT DOCUMENTS

| | | | |
|---|---|---|---|
| 1,705,293 | 3/1929 | Horthy et al. | 137/540 X |
| 2,745,432 | 5/1956 | Williams | 137/540 |
| 3,155,110 | 11/1964 | Hoffman | 137/493.1 |
| 3,200,843 | 8/1965 | Jackson | 137/614.19 |
| 3,439,703 | 4/1969 | Toda et al. | 137/480 |
| 3,503,418 | 3/1970 | Petrucci et al. | 137/515 |
| 3,929,158 | 12/1975 | Rodgers | 137/493.9 |
| 3,938,692 | 2/1976 | Crute | 220/203 |
| 3,943,969 | 3/1976 | Rubin et al. | 137/538 |
| 3,968,897 | 7/1976 | Rodgers | 220/204 |
| 4,000,828 | 1/1977 | Crute et al. | 220/203 |
| 4,011,848 | 3/1977 | Coddington | 123/136 |
| 4,040,404 | 8/1977 | Tagawa | 123/136 |
| 4,083,209 | 4/1978 | Sloan, Jr. | 70/165 |
| 4,099,894 | 7/1978 | Indra | 417/499 |
| 4,541,455 | 9/1985 | Hauser | 137/516.27 |

*Primary Examiner*—John Rivell
*Attorney, Agent, or Firm*—Barnes & Thornburg

[57] ABSTRACT

A flow-metering valve assembly is provided for vehicle fuel tanks. The assembly includes a valve housing having an interior wall configured to define a chamber having an inlet and an exhaust outlet. The interior wall provides a first flow-metering surface situated in close proximity to the outlet. A spring-biased pressure-relief element is situated in the chamber and includes a valve member having an inner surface confronting the inlet and an upstanding skirt attached to the valve member. The skirt has a distal portion extending in an outward direction toward the outlet means to provide a second flow-metering surface. The first and second surfaces cooperate to define a variable flow-metering orifice therebetween. The second flow-metering surface is moved in relation to the first flow-metering surface in response to relative movement of the valve member and the valve seat to vary the size of the variable flow-metering orifice so that the flow of pressurized fuel vapor through the variable flow-metering orifice is metered in accordance with a predetermined specification

3 Claims, 1 Drawing Sheet

U.S. Patent
Feb. 21, 1989
4,805,663
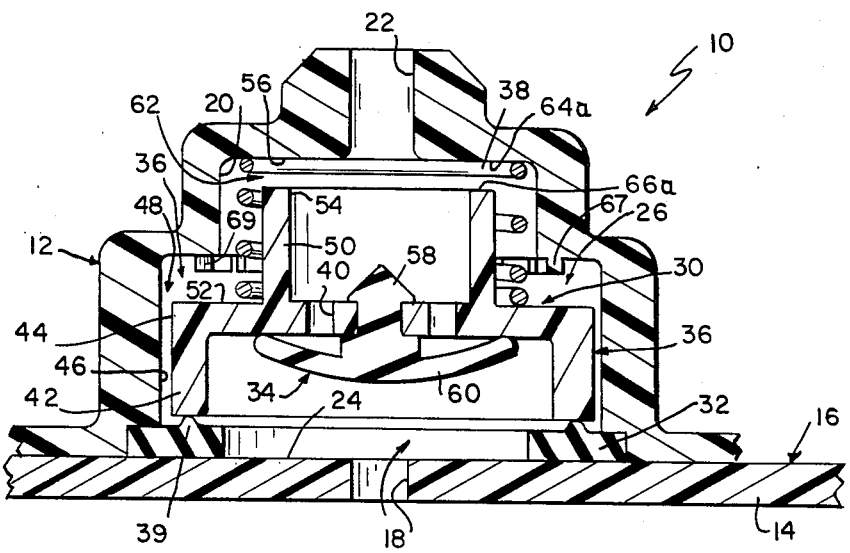
FIG. 1
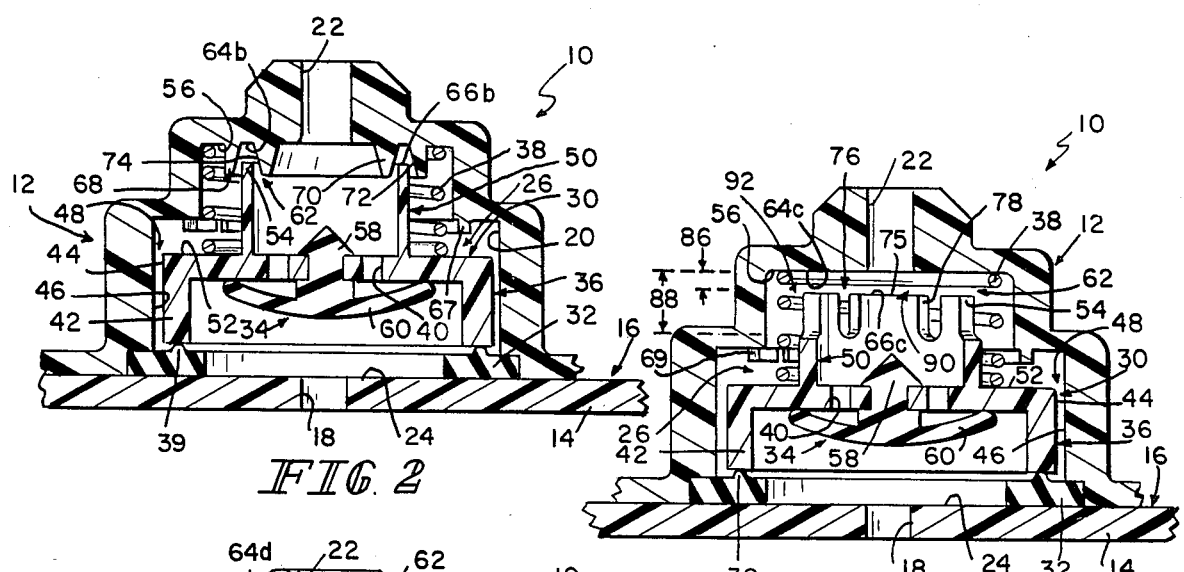
FIG. 2
FIG. 3
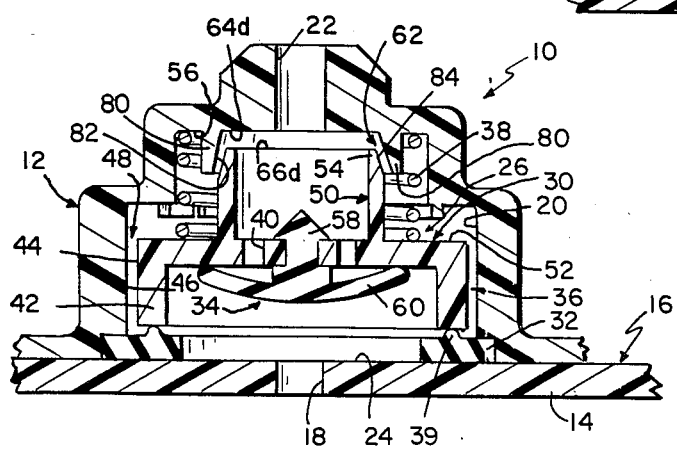
FIG. 4

FLOW CONTROL VALVE

This is a division of application Ser. No. 935,814 filed Nov. 28, 1986, now U.S. Pat. No. 4,715,703.

The present invention relates to fuel system valves, and particularly to a flow control valve for regulating the discharge of pressurized fuel vapor from a fuel tank. More particularly, the present invention relates to a valve assembly having a pressure-relief valve and a flow-metering orifice in the assembly that changes in size in a predictable manner during operation of the valve to control the flow of fuel vapor through the assembly in accordance with a predetermined specification.

Vehicle fuel systems are known to include pressure-relief valves mountable on either fuel tanks or filler necks. In general, the venting portion of these conventional valve assemblies has included a pressure-relief valve positioned in a vent passageway having a surface exposed to the pressure in the tank and a yieldable control spring urging the pressure-relief valve normally to close the vent passageway. In response to a predetermined superatmospheric pressure, the pressure-relief valve is urged in opposition to the control spring to open the vent passageway.

In practice, it is desirable to provide a safety pressure-relief valve that opens quickly in response to a small change in the pressure fuel vapor in the fuel tank. Valve opening time can be reduced by increasing the force applied to the valve at constant pressure. Such an increase is typically obtained by enlarging the outlet opening in the fuel tank normally closed by the valve so that the pressure in the fuel tank acts over a larger surface area, thereby increasing the lifting force applied to the valve. While such a large diameter tank outlet opening is initially necessary to provide a quick-opening valve capable of immediate venting, in certain circumstances, this large-diameter opening can vent fuel vapor into the atmosphere at a flow rate in excess of design specifications while the companion valve is open.

A valve system including means for controllably metering the flow rate of pressurized fuel vapor discharged during venting activity would avoid shortcomings of known valve systems. Conventional valves are not equipped to meter the flow of pressurized fuel vapor from the fuel tank or other fuel system components at a selected variable rate in accordance with a predetermined specification matching, for example, the flow rate of pressurized fuel vapor discharged by the valve and fuel tank pressure. Such a specification is often represented by a plot of the volumetric flow rate of discharged fuel vapor as a function of the magnitude of pressure in the fuel tank.

In many cases, it is desirable to vary the fuel vapor flow rate automatically during operation of the valve. For example, in order to meet a selected flow rate/tank pressure specification, it may be necessary to reduce the flow rate of fuel being discharged by the valve if the tank pressure increases while the valve is open. However, the size of the flow discharge orifice in conventional valve assemblies typically does not decrease to vary the flow of pressurized fuel vapor therethrough in accordance with a predetermined flow schedule at tank pressure levels of greater magnitude than the tank pressure necessary to actuate the valve initially. While conventional valve assemblies operate to vent excessive fuel vapor pressure from the fuel tank, they do not provide means for selectively increasing and decreasing the flow of pressurized fuel vapor discharged from the fuel tank as a function of the magnitude of pressure in the fuel tank.

One object of the present invention is to provide a pressure-relief valve assembly that meters the volumetric flow rate of pressurized fuel vapor discharged therethrough in accordance with a predetermined specification.

Another object of the present invention is to provide a pressure-relief valve assembly that will open quickly in response to a small change in pressure to provide immediate venting and thereafter meter the discharge of pressurized fuel vapor at either a low flow rate, a high flow rate, or a predetermined non-linear combination of high and low flow rates, as a function of the magnitude of pressure existing in the fuel tank.

According to the present invention, a flow-metering, pressure-relief valve assembly is provided for vehicle fuel tanks or other components in a vehicle fuel system. The assembly includes a valve housing having an interior wall configured to define a chamber, inlet opening means for admitting fuel vapor into the chamber, and outlet opening means for exhausting fuel vapor from the chamber, a valve seat situated in the chamber to surround the inlet opening means and attached to the valve housing, and a pressure-relief element in the chamber. The pressure-relief element includes a valve member having an inner surface confronting the inlet opening means and an upstanding skirt attached to the valve member. Biasing means is provided for yieldably biasing the valve member against the valve seat normally to close the inlet opening means.

The assembly provides a novel system for metering the flow of pressurized fuel vapor through the assembly to control and regulate the pressure in the fuel tank for a variety of purposes. The interior wall provides a first flow-metering surface situated in close proximity to the outlet opening means. The upstanding skirt has a distal portion extending in an outward direction toward the outlet opening means in spaced relation to the first flow-metering surface. The distal portion provides a second flow-metering surface which cooperates with the opposite first flow-metering surface to define a flow-metering orifice of variable size therebetween. The first and second flow-metering surfaces have contoured shapes that are configured to meter the flow of pressurized fuel vapor through the orifice in accordance with a predetermined specification. This specification matches the flow rate of fuel vapor exhausted from the chamber through the outlet opening means to the magnitude of pressure exposed to the inner surface of the valve member.

The cross-sectional size of the flow-metering orifice at a certain tank pressure is determined by a variety of factors, most notably, relative movement of the first and second flow-metering surfaces and the contour of exterior shape of those surfaces. Relative movement of the first and second flow-metering surfaces acts to vary the size of the orifice. This variance in size affects the vapor discharge capacity of the assembly by restricting or enlarging the cross-sectional area of the orifice. Careful selection of the shape of each flow-metering surface makes it is possible to modify the size of the orifice. In one embodiment, due to the shapes of the flow-metering surfaces, the cross-sectional area of the orifice can be enlarged even though the valve member is moving away from its seat, and, the cross-sectional area of the orifice can be reduced even though the valve member is moving toward its seat. Thus, the shapes of the spaced-apart flow-metering surfaces can be selected during a design stage to, in essence, "program" the discharge capacity (i.e. flow rate) of the assembly as a function of tank pressure in accordance with a predetermined specification.

In particular, the predetermined specification matches a series of fuel vapor pressures occurring in the fuel tank with a corresponding series of flow rates of pressurized fuel vapor discharged from the fuel tank through the flow-metering orifice to define a selected flow-pressure schedule.

In preferred embodiments, the valve member divides the chamber into a first portion communicating with the fuel tank via the inlet opening means and a second portion communicating with the outlet opening means. Pressurized fuel vapor in the first portion in excess of a predetermined amount acts against the inner surface of the spring-biased valve member to move the valve member away from its seat, thereby moving the second flow-metering surface relative to the first flow-metering surface. The second flow-metering surface is moved to a predetermined position in the valve chamber associated with the magnitude of the fuel vapor pressure in the first valve chamber portion. Such movement causes the orifice to have a flow capacity sufficient to discharge pressurized fuel vapor therethrough in accordance with the predetermined specification.

One feature of the present invention is the provision of a flow-metering orifice of variable size between the interior wall of the valve housing and the pressure-relief valve member. This orifice advantageously changes in size during operation of the assembly as a function of the magnitude of pressure in the fuel tank to control the flow of fuel vapor through the assembly, thereby regulating the pressure in the fuel tank.

Another feature of the present invention is the cooperation of a first flow-metering surface on the fixed valve housing and a second flow-metering surface on the movable pressure-relief valve to define a variable flow-metering orifice. The first and second flow-metering surfaces have contoured shapes that are configured to match the instantaneous size of the orifice to the magnitude of pressure existing in the first valve chamber portion in accordance with a predetermined specification. Thus, the particular contour of the flow-metering surfaces may be advantageously selected during an initial design stage to produce a selected flow/pressure schedule suitable to meet substantially any predetermined specification. Advantageously, an infinite number of flow/pressure relationships are obtainable due to this feature merely by altering the configuration of the first and/or second flow-metering surfaces.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a sectional detailed view of one embodiment of a valve assembly in accordance with the present invention;

FIG. 2 is a sectional detailed view of another embodiment of a valve assembly in accordance with the present invention;

FIG. 3 is a sectional detailed view of yet another embodiment of a valve assembly in accordance with the present invention; and FIG. 4 is a sectional detailed view of still another embodiment of a valve assembly in accordance with the present invention.

DETAILED DESCRIPTION OF THE DRAWINGS

In the embodiment illustrated in FIG. 1, a valve assembly 10 includes a hollow valve housing 12 that is mounted on a wall 14 of a fuel tank 16. Valve assembly 10 is positioned in communication with an aperture 18 formed in wall 14. The valve assembly 10 functions to meter the flow rate of pressurized fuel vapor discharged to the atmosphere or other point of use in accordance with a predetermined flow rate/tank pressure specification. As a result of this metering function, the valve assembly 10 regulates the pressure within fuel tank 14, thereby controlling the maximum fuel tank pressure.

The valve housing 12 includes an interior wall 20 and an outlet passage 22. The interior wall 20 and outer surface 24 of wall 14 cooperate to define vapor discharge chamber 26. Fuel vapors are admitted into chamber 26 through the aperture 18 and exhausted therefrom through the outlet passage 22. Thus, aperture 18 provides an inlet opening for the valve assembly 10.

A pressure-vacuum valve 30 is installed in chamber 26 to regulate pressure in the fuel tank 16. The pressure-vacuum valve 30 includes a gasket 32, an umbrella valve 34, a valve member 36, and a spring 38. The gasket 32 is positioned on outer surface 24 of wall 14 to surround aperture 18. Gasket 32 includes an inwardly projecting annular valve seat 39.

The valve member 36 includes a central portion forming four circumferentially spaced fluid-conducting apertures 40 and a peripheral ring flange 42 defining an exterior side wall 44. Side wall 44 is positioned in close proximity to a lower portion 46 of interior wall 20 to define an annular passageway 48 therebetween. The valve member 36 further includes an upstanding skirt 50 fixed to a top surface 52 of the central portion. The skirt 50 includes a distal end 54 positioned in close proximity to a downwardly-facing portion 56 of the interior wall 20.

The umbrella valve 34 is made of a pliable material and includes a stem 58 that is installed in a central aperture formed in the valve member 36. Valve 34 also includes a resilient valve cover 60 that is positioned normally to cover the lower opening of each of the apertures 40 formed in the valve member 36. The spring 38 is installed in the chamber 26 between wall 56 and the top surface 52 of the valve member 36 in a position surrounding skirt 50. Thus, the spring 38 provides means for yieldably urging the ring flange 42 into seating engagement with the valve seat 39 provided by gasket 32.

The flow of fuel vapor discharged through outlet passage 22 is metered between an orifice 62 established by interior wall 20 and skirt 50 to regulate the pressure in chamber 26 in fuel tank 14. Downwardly-facing surface 56 of interior wall 20 is configured to provide a first flow-metering surface 64a while distal end 54 of skirt 50 is configured to provide a second flow-metering surface 66a. The two flow-metering surfaces 64a, 66a lie in confronting relation to one another to define the flow-metering orifice 62 therebetween. In the embodiment of FIG. 1, both of these flow-metering surfaces 64a, 66a are substantially flat.

In operation, the spring-biased valve member 36 functions to vent fuel vapor from the fuel tank 14 and valve assembly 10 only when the pressure exceeds a predetermined threshold level. Pressurized fuel tank vapor can exert a lifting force on the valve member 36 to urge the same against the spring 38, thereby lifting ring flange 42 off valve seat 39 to open the annular passageway 48 between the valve member 36 and the interior chamber wall 46. The pressurized fuel vapor is metered through orifice 62 and then discharged from the valve housing 12 via outlet 22 and conducted to the atmosphere or to a treatment site such as a conventional fuel canister (not shown). The mass and configuration of valve member 36, the size of the various fluid-connecting passages, and the spring constant of the spring 38 are selected to define the threshold pressure level.

An annular skirt 67 extends into vapor discharge chamber 26 to provide stop means for limiting upward travel of valve member 36. Skirt 67 depends from a downwardly-facing surface of inner wall 20 in confronting relation to the top surface 52 of valve member 36. Skirt 67 is formed to include a plurality of slots 69 so as to permit fuel vapor to flow, thereby preventing flow shut-off. The height of skirt 67 is of such dimensions so as not to limit fuel vapor flow.

The flow rate of fuel vapor discharged is determined in part by the cross-sectional size of orifice 62. It will be appreciated that this size changes during operation of the valve assembly 10 and is a function at least of the relative position and configuration of the first and second flow-metering surfaces 64a, 66a. Thus, the pressure-vacuum valve 30 functions to meter the flow rate of discharge fuel vapor, thereby regulating the maximum pressure allowable in the fuel tank 14.

The umbrella valve 34 regulates flow of ambient air or the like from the atmosphere or canister (not shown) into the chamber 26 and the fuel tank 14 in response to suction caused by a vacuum in the fuel tank 14. Subatmospheric pressure in the fuel tank 14 will exert a downwardly-directed force to the resilient valve cover to at least partially open the umbrella valve 34 and draw ambient air or the like through outlet passage 22 and valve member apertures 40 into the chamber 26. A vacuum created in the fuel tank 14, due to condensation or the like, will act to draw fuel/fuel vapor from the canister (not shown) back into the tank 14. This will prevent the pressure in the fuel tank 14 from dropping to zero and hold the tank pressure constant during an overnight vehicle cool-down or short-term vehicle parking.

In the embodiments of the invention illustrated in FIGS. 2-4, those elements referenced by numbers identical to those in FIG. 1 perform the same or similar function. The pressure-relief and vacuum-relief features of these additional embodiments operate in essentially the same manner as the embodiment of FIG. 1.

The primary feature distinguishing each of the embodiments illustrated in FIGS. 2-4 is the configuration of the first and second flow-metering surfaces, 64b–d and 66b–d, respectively. In each case, the contour and shape of both flow-metering surfaces have been selected to meter the flow rate of fuel vapor through the orifice defined therebetween in accordance with a predetermined engineering specification. In preferred embodiments, that predetermined engineering specification correlates the volumetric flow rate of fuel vapor through the orifice to the magnitude of the fuel vapor pressure existing in the fuel tank 14. It will be appreciated that by selecting a proper configuration for the first and second flow-metering surfaces and the proper spring constant for spring 38, it is possible to discharge fuel through the flow-metering orifice at a selected flow rate corresponding to a selected fuel tank pressure in accordance with virtually any flow-pressure schedule.

Referring to the embodiment of FIG. 2, a pair of annular baffles 68, 70 depend from downwardly-facing surface 56. First baffle 68 surrounds second baffle 70 and extends into chamber 26 in an axially-inward direction toward the top surface 52 of valve member 36. Second baffle 70 also extends downwardly into chamber 26 and is fixed in spaced-apart relation to the surrounding first baffle 68 as shown in FIG. 2. The first and second baffles 68, 70 cooperate to define an annular space therebetween for receiving the distal end 54 of upstanding skirt 50 during movement of valve member 36 within chamber 26.

The first baffle 68 illustratively includes an annular, radially-inwardly facing surface 72 and the second baffle 70 illustratively includes an annular, radially-outwardly facing surface 74. Surfaces 72, 74 and the flat annular surface interconnecting surfaces 72, 74 cooperate to define the first flow-metering surface 64b. In this embodiment, the second flow-metering surface 66b is substantially flat.

Referring to the embodiment of FIG. 3, the first flow-metering surface 64c is provided by the substantially flat surface 56. The distal end 54 of skirt 50 has a top wall 75 and is formed to include a plurality of circumferentially-spaced slots 76 having inner walls 78. In this embodiment, walls 75 and 78 cooperate to define the second flow-metering surface 66c.

In the embodiment of FIG. 3, each of the first and second flow-metering surfaces includes a radially inner downstream end at 90 in close proximity to the outlet passage 22, an opposite radially outer upstream end at 92, and an intermediate section extending therebetween. A first dimension 86 separates opposing portions of the upstream ends and a relatively greater second dimension 88 separates opposing portions of the intermediate sections as shown in FIG. 3 due to the depth of the slots 76.

Referring to the embodiment of FIG. 4, a baffle 80 depends from downwardly-facing surface 56 and extends into chamber 26 in an axially-inward direction toward the top surface 52 of valve member 36. Baffle 80 includes an annular, radially inwardly-facing surface 82 which provides the first flow-metering surface 64d. The distal end 54 is formed to include an annular, radially outwardly-facing surface 84 which provides the second flow-metering surface 66d.

Although the invention has been described in detail with reference to certain preferred embodiments, variations and modifications exist within the scope and spirit of the invention as described and as defined in the following claims.

What is claimed is:

1. A flow-metering pressure-relief valve assembly for vehicle fuel tanks and the like, the assembly comprising a valve housing having an interior wall configured to define a chamber, inlet opening means for admitting fuel vapor into the chamber, and outlet opening means for exhausting fuel vapor from the chamber, the interior wall providing a first flow-metering surface situated in close proximity to the outlet opening means, a valve seat attached to the valve housing and situated in the chamber to surround the inlet opening means, a pressure-relief element in the chamber, the pressure-relief element including a valve member having an inner surface confronting the inlet means, and an upstanding skirt attached to the valve member and having a distal portion extending in an outward direction toward the outlet means in spaced relation to the interior wall of the valve housing, the distal portion providing a second flow-metering surface which cooperates with the first flow-metering surface to define a variable flow-metering orifice therebetween, and biasing means for yieldably biasing the valve member against the valve seat normally to close the inlet opening means, the second flow-metering surface being moved in relation to the first flow-metering surface in response to relative movement of the valve member and the valve seat to vary the size of the variable flow-metering orifice, the first and second flow-metering surfaces having predetermined shapes that are configured to meter the flow of pressurized fuel vapor through the variable flow-metering orifice in accordance with a predetermined specification matching the flow rate of fuel vapor exhausted through the outlet opening means to the magnitude of the pressure exposed to the inner surface of the valve member, the distal portion of the upstanding skirt being formed to include a plurality of circumferentially spaced slots in the region providing the second flow-metering surface.

2. A safety pressure-relief assembly for vehicle fuel tanks and the like, the assembly comprising a hollow valve housing including an interior wall defining a valve chamber having an inlet and an outlet, the interior wall including a first flow-metering surface, and partition means for dividing the valve chamber into a first portion communicating with the fuel tank via the inlet and a second portion communicating with the outlet, the partition means including pressure-relief means for discharging pressurized fuel vapor or the like from the first valve chamber portion to the second valve chamber portion to reduce fuel tank pressure, the pressure-relief means including a movable pressure-relief valve positioned in the valve chamber, the movable valve including a second flow-metering surface situated in the second valve chamber portion confronting the first flow-metering surface in spaced relation to define a variable flow-metering orifice therebetween, the size of the variable flow-metering orifice being functionally related to the spacing between the first and second flow-metering surfaces, the first and second flow-metering surfaces being configured to match the size of the variable flow-metering orifice to the magnitude of pressure in the first valve chamber portion in accordance with a predetermined specification so that the size of the variable flow-metering orifice varies automatically as a function of pressure in the first valve chamber portion during operation of the pressure-relief means to regulate the flow of pressurized fuel vapor exhausted through the valve housing outlet, the distal portion of the upstanding skirt being formed to include a plurality of circumferentially spaced slots in the region providing the second flow-metering surface.

3. A safety pressure relief assembly for vehicle fuel tanks and the like, the assembly comprising a valve housing formed to include a valve chamber having an inlet and an outlet, the valve housing providing a first flow-metering surface in the valve chamber, a valve seat in the valve chamber surrounding the inlet, a valve providing a second flow-metering surface, the valve being movably mounted in the valve chamber to project the second flow-metering surface away from the valve seat toward a position in close proximity to the first flow-metering surface, the first and second flow-metering surfaces cooperating to define a variable flow-metering space therebetween, the variable flow-metering space having a size that varies during relative movement of the first and second flow-metering surfaces to define a vapor-discharge capacity of the assembly, and spring means for yieldably biasing the valve against the valve seat normally to block flow of fuel vapor from the inlet to the outlet via the valve chamber and move the second flow-metering surface away from the first flow-metering surface along a path, the valve acting against the spring means to move the second flow-metering surface along the path toward the first flow-metering surface to change the size of the variable flow-metering space in accordance with a predetermined specification functionally relating the size of the variable flow-metering space to pressure admitted into the valve chamber via the inlet during exposure of the valve to pressure in excess of a predetermined amount so that the vapor-discharge capacity of the variable flow-metering space is matched to the magnitude of the valve-actuating pressure acting upon the valve, the valve including a distal portion extending in an outward direction toward the outlet of the valve chamber, the distal portion being formed to include a plurality of circumferentially spaced slots in the region providing the second flow-metering surface.

* * * * *